United States Patent Office 3,812,205
Patented May 21, 1974

3,812,205
PROCESS FOR PREPARING GRAFTLINKED
HETEROPOLYMER FILM
David L. Dunkelberger, Levittown, Pa., assignor to
Rohm and Haas Company, Philadelphia, Pa.
No Drawing. Continuation-in-part of abandoned application Ser. No. 27,995, Apr. 13, 1970. This application Sept. 20, 1972, Ser. No. 290,678
Int. Cl. B32b 27/30; C08f 15/18
U.S. Cl. 260—885                    16 Claims

ABSTRACT OF THE DISCLOSURE

Production of heteropolymer latex particles wherein the particles consist essentially of a first-stage rubbery crosslinked emulsion polymer having a $T_g$ below 10° C. comprising at least one $C_1$ to $C_8$ alkyl acrylate and a graftlinker and a second-stage thermoplastic polymer having a $T_g$ above about 60° C. comprising a hard alkyl ester of methacrylic acid graftlinked to said first-stage by adding gradually a stream of said second-stage monomer to said first-stage and polymerizing rapidly the second-stage monomer. The polymer particles are preferably isolated, dried and converted into film using heat and pressure.

---

This application is a continuation-in-part of Ser. No. 27,995 filed Apr. 13, 1970, and now abandoned.

In U.S. patent application Ser. Nos. 526,038, filed Feb. 9, 1966 now abandoned, and 735,191, filed June 7, 1968 which has matured into U.S. Pat. 3,562,235, of Ryan, there are described certain multi-stage heterogeneous sequentially emulsion polymerized compositions. Useful films produced from these compositions exhibit excellent elongation characteristics which permit their use as a protective film for other materials such as polystyrene, e.g., high impact polystyrene, to provide laminates which may be bent and worked over sharp corners without cracking, peeling, or delamination. The films also exhibit excellent blocking resistance and further are quite useful in the adhering of film materials to metal substrates.

Typically, the polymerized composition described above comprises a first-stage, rubbery, uniformly crosslinked polymer of a $C_2$ to $C_8$ alkyl acrylate having a maximum glass transition temperature of the order of −20° C. having sequentially copolymerized thereon a polymer of a $C_2$ to $C_8$ alkyl acrylate with a $C_1$ to $C_4$ alkyl methacrylate; the amount of $C_1$ to $C_4$ alkyl methacrylate increases and the amount of $C_2$ to $C_8$ alkyl acrylate decreases from the center of the polymer particles outward. Thus in the case of a four-stage polymeric product, the second-stage is apparently attached to or intimately associated with the first-stage with only slight layering, the third-stage is apparently attached to or intimately associated with the two-stage material with more layering and the fourth-stage, i.e., the last or hard stage, is apparently attached to or intimately associated with the three-stage material by substantially all layering and with relatively little penetration of the prior three-stage material. The layering effects of the last stage or stages is encouraged by gradually adding monomers to the polymerization zone and polymerizing said monomers rapidly before they penetrate deeply into the rubbery core or form additional polymer particles. Greater detail is provided in the aforementioned applications, the disclosures of which are incorporated herein by reference.

In U.S. patent application 877,847, filed Nov. 18, 1969 and now abandoned of Dunkelberger, there is described a stain and solvent resistant composition consisting essentially of a first-stage, rubbery, crosslinked emulsion polymer of a $C_1$ or $C_2$ acrylate or mixtures thereof with each other or with certain other specified monomers, a second-stage thermoplastic polymer emulsion polymerized directly on the said first-stage and consisting essentially of at least 25% of the first-stage monomers and up to 75% of a $C_1$ to $C_4$ methacrylate, and a final-stage thermoplastic polymer emulsion polymerized on the first and second stages which consist essentially of at least 90% by weight of a $C_1$ to $C_4$ alkyl methacrylate and the balance any of a number of various monomers such as $C_1$ to $C_8$ acrylates, acrylic acid, methacrylic acid, etc. Each of these polymer compositions are of considerable utility for the purposes indicated in the respective patent applications. Inherent in each, however, is the necessity of providing a polymer intermediate the first-stage, rubbery, crosslinked polymer and the final thermoplastic polymer in order to provide sufficient adhesion between the first and final stage polymers so that the character of the final latex particles will not be destroyed in the production of films therefrom.

It has now been found that by the inclusion of certain graftlinking monomers in the monomer charge for the first-stage, rubbery, crosslinked polymer of any of the foregoing described systems and by critically limiting certain characteristics of the systems, latex particles can be produced without the intermediate stages, which latex particles can be melt formed into films and sheets of exceptional characteristics.

In accordance with the present invention, therefore, there is provided a polymeric material comprising:

(a) a first-stage having a glass transition temperature below 10° C. consisting essentially of a rubbery, crosslinked emulsion polymer of a monomer selected from the group consisting of:

(1) at least one $C_1$ to $C_8$ alkyl acrylate, and
(2) mixtures comprising a major amount (more than 50% by weight) of one of said alkyl acrylates, or mixtures thereof, with a minor amount (less than 50% by weight) of one or more copolymerizable monoethylenically unsaturated monomers and as a graftlinker an allyl ester of an $\alpha,\beta$-unsaturated carboxylic acid; and (b) a second-stage, thermoplastic polymer having a glass transition temperature above about 60° C. and of weight-average molecular weight of 80,000–300,000, preferably 100,000–150,000, emulsion polymerized on said first-stage, consisting essentially of at least 80% by weight of a hard alkyl ester of methacrylic acid, and the balance of one or more copolymerizable monoethylenically unsaturated monomers.

The first-stage, rubbery polymer must have a glass transition ($T_g$) below 10° C. and should comprise at least 35% and up to 50% of the composition, preferably in the range of 40–45%. The latter range provides an excellent balance of toughness, impact-resistance, blocking temperature, low temperature strength properties, and processability. While the $C_1$ to $C_8$ alkyl acrylates whether straight-chained or branched are useful for the purposes described herein, the preferred groups are those containing two to four carbon atoms and, more specifically, ethyl acrylate, propyl acrylate, and butyl acrylate. Of these, butyl acrylate and ethyl acrylate are particularly preferred and provide the most significant physical characteristics for the purpose of the present invention.

As indicated above, a minor amount of the first-stage rubbery copolymer can comprise one or more copolymerizable monoethylenically unsaturated monomers provided the first-stage copolymer has a $T_g$ below about 10° C. Suitable copolymerizable monomers include other alkyl or substituted esters of alpha, beta-ethylenically unsaturated monocarboxylic acids, such as alkyl esters of methacrylic acid containing from 1 to 18 carbon atoms (e.g. methyl methacrylate, 2-ethylhexyl methacrylate, stearyl methacrylate, etc.), hydroxyalkyl esters of alpha, beta-ethylenically unsaturated monocarboxylic acids (hydroxyethyl methacrylate, 2-hydroxypropyl acrylate, etc.), cyanoalkyl esters of alpha, beta-ethylenically unsaturated monocarboxylic acids (cyanoethyl acrylate 2-cyanopropyl methacrylate, etc.) lower alkoxyalkyl esters of alpha, beta-ethylenically unsaturated monocarboxylic acids (ethoxyethyl acrylate, propoxyethyl methacrylate, 2-ethoxypropyl acrylate, etc.), aminoalkyl esters of alpha, beta-ethylenically unsaturated monocarboxylic acids (N,N-diethylaminoethyl acrylate, N-tert-butyl-aminoethyl methacrylate, etc.); alpha, beta-ethylenically unsaturated amides (acrylamide, methacrylamide, etc.), alpha, beta-ethylenically unsaturated nitriles (acrylonitrile, methacrylonitrile, etc.); alpha, beta-ethylenically unsaturated acids (methacrylic acid, acrylic acid, itaconic acid, etc.); monovinyl aromatics (styrene, vinyltoluene, etc.); etc.

A crosslinking bi- or polyfunctional monomer must be used in the first-stage for crosslinking the alkyl acrylate monomer. The presence and level of crosslinking monomer is critical to the successful result of the present invention; the range of 0.5–5% by weight based on the alkyl acrylate is satisfactory, with 0.5 to 1.5% by weight being preferred. Also, the crosslinking monomer must have at least two addition polymerizable vinylidene groups of substantially equal reactivity to uniformly crosslink the alkyl acrylate. Preferably the crosslinkers are alpha, beta-ethylenically unsaturated monocarboxylic acid esters of polyhydric alcohols containing two to six ester groups. Crosslinking monomers of this type can be incorporated evenly into the ploymerization reaction and their concentration in the reaction medium is usually independent of the extent of the completion of the reaction. In other words, their rate of consumption is essentially the same as the principal monomer such as the alkyl acrylate which is present. Suitable preferred crosslinking monomers include alkylene glycol diacrylates and dimethacrylates such as ethylene glycol diacrylate, 1,3-butylene glycol diacrylate, 1,4-butylene glycol diacrylate, propylene glycol diacrylate, triethylene glycol dimethacrylate, etc.; 1,3-glycerol dimethacrylate, 1,1,1-trimethylol propane dimethacrylate, 1,1,1-trimethylol ethane diacrylate, pentaerythritol trimethacrylate, 1,2,6-hexane triacrylate, sorbitol pentamethacrylate, etc. Other useful cross-linkers include methylene bisacrylamide, methylene bismethacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, hexatriene, diallyl cyanamide, ethylene glycol divinyl ether, diallyl phthalate, divinyl dimethyl silane, glycerol trivinyl ether, divinyl adipate, etc.

The graftlinking monomers having at least two copolymerizable ethylenically unsaturated bonds which react at substantially different rates introduced into the first-stage rubbery polymers comprise allyl esters of $\alpha,\beta$ unsaturated mono and dicarboxylic acids having terminal ethylenic unsaturation and allyl esters of alpha, beta-ethylenically unsaturated alpha, beta-dicarboxylic acid. Typical useful esters include allyl methacrylate, allyl acrylate, diallyl maleate, diallyl fumarate and diallyl itaconate. Obviously, the ester should be selected for its compatibility with the particular monomer system utilized. However, the acrylate and methacrylate esters are particularly useful.

The significant characteristic of the graftlinker appears to be the relationship of the unsaturated groups to the ester portion of the monomer. The conjugatedly unsaturated acid portion of the ester reacts far more readily than the allyl group in the polymerization of the first-stage polymer, and is chemically bound to this stage. Thus, a substantial portion of the allyl groups remain available for reaction during the second-stage polymerization to provide graftlinking between the two stages.

In the absence of the graftlinker, there is substantially no grafting between the first and second stages. By the process of the present invention using a graftlinker in the manner described, attachment from about 5% to greater than 95% can be obtained easily. Among the factors which will influence the precise value are the amount of crosslinker, the amount of graftlinker, relative amounts of first and second-stage polymers, and the molecular weight of the second-stage polymer. Undesirable film properties such as poor extrusion processing, stress whitening, hazing, and raising of the brittle temperature may result if insufficient crosslinker and/or graftlinker are employed. This, therefore, should always be taken into consideration in determining the relative proportions of the crosslinker and graftlinker to be utilized. For the purpose of the present invention, these factors should be balanced, and the relative proportions of crosslinker and graftlinker should be adjusted, to provide at least 20%, and less than 50%, attachment of the second-stage to the first-stage. In general, with about 1% by weight of crosslinker, about 0.5% of graftlinker will provide this minimum amount of attachment. In the preferred practice of the invention, the attachment level should be in the range of about 25% to 35%.

As indicated above, the hard stage must have a glass transition temperature of at least 60° C. and comprise at least 80% by weight of a hard alkyl ester of methacrylic acid. Additionally, the second-stage polymer should have the highest molecular weight possible consistent with processability of the final product. Suitable hard alkyl esters of methacrylic acid include the $C_1$ to $C_4$ alkyl methacrylates (methyl methacrylate, ethyl methacrylate, isopropyl methacrylate, t-butyl methacrylate, etc.); cycloalkyl methacrylate (cyclohexyl methacrylate), etc. The second-stage can also contain one or more of the principal monomers of the first-stage or monoethylenically unsaturated monomers copolymerizable with the principal monomers of the first-stage provided the second-stage monomers have a Tg of at least 60° C. Advantageously, the second-stage can contain a minor amount, i.e., up to about 20 parts per 100 parts of second-stage methacrylate ester monomers, of an adhesion promoter which incorporates acid units therein. Examples are $\alpha,\beta$ unsaturated acids such as acrylic acid, methacrylic acid, etc., and unsaturated dicarboxylic acids such as itaconic, maleic and fumaric acids.

The method of making the composition of the present invention is of considerable significance in providing the exceptional properties associated with the product. Thus, one factor which must be considered is the particle size of the first-stage elastomer particles. These particles should have an average particle size of less than 1300 angstroms. If this value is exceeded, film made from the final latex exhibits increased haze and substantial stress whitening. However, even compositions in which the elastomer particle size is somewhat smaller than 1300 angstroms, the film, in some instances, can exhibit substantial stress whitening depending on the extent of graftlinking, etc. In general, therefore, the elastomer particles should have an average particle size in the range of about 1000 to 1200 angstroms.

As indicated above, gradual addition of monomer during the second-stage and rapid polymerization of monomer in the second-stage facilitates the formation of polymeric layers around the rubbery core and reduces the possibility of the second-stage monomer penetrating deeply into the rubbery core. Gradual addition in the second-stage is more important in this invention than in the process of the Ryan applications, supra. Unlike the Ryan applications where there is a gradual transitional change in the hardness of the monomer charges used to form the four or more stages or layers, there is a substantial difference in the hardness of the monomer charges used to form the two stages or layers of this invention. Accordingly, penetration of monomer added in one stage of Ryan into the preceding layer has a much smaller effect on the final physical properties of the polymer particles than in the instant invention. Further, as pointed out in Ryan, the last or hardest monomer charge, which is comparable to the second charge used in the present invention, has a smaller tendency to penetrate into the preceding layers, probably due to the intestices of the polymer particles being filled in by monomer added in preceding stages. If all of the second monomer charge is added at one time in the present invention the hard monomer penetrates deeply into the rubbery core and polymerizes to form polymer particles, which, when isolated, are incapable of being formed directly into sheets or films by melt (heat and pressure) techniques. In other words the rubbery, deformable character of the heteropolymer is lost because the hard monomer charge imbrittles the rubbery core.

The type and level of emulsifier utilized controls the particle size of the first-stage latex particles. For the most part, the soaps normally used in emulsion polymerization can be used satisfactorily provided care is exercised in utilizing the minimum amount necessary to give the desired result and the polymer is isolated by coagulation. If the latex is isolated by spray drying, the selection of emulsifier becomes more critical since it remains with the polymer.

The level of emulsifier is preferably below one percent by weight based on the total weight of the polymerizable monomrs charged in all stages. Useful emulsifying agents include common soaps, albylbenzenesulfonates, such as sodium dodecyl benzene sulfonate, albylphenoxypolyethylene sulfonates, sodium lauryl sulfate, salts of long-chain amines, salts of long-chain carboxylic and sulfonic acids, etc. In general, the emulsifier should be compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like.

The polymerization medium in each stage will contain an effective amount of a suitable free radical generating polymerization initiator, which is activated either thermally or by an oxidation-reduction (or redox) reaction. The preferred initiators are those which are the result of redox reactions, since they allow for efficient polymerization at moderate reaction temperatures. Examples of suitable oil-soluble, water-soluble initiators are combinations such as cumene hydroperoxide-sodium metabisulfite, disopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble initiators may also be used; examples of such initiators or initiator combinations are sodium persulfate, potassium persulfate-sodium formaldehyde sulfoxylate, etc.

The two-stage sequential emulsion polymerization can be carried out at temperatures ranging from about 0° C. to 125° C., with 30° C. to 95° C. being preferred for the first-stage and 60–100° C. for the second-stage being preferred. The higher the polymerization temperature in the second-stage the faster the rate of polymerization and the less penetration of monomer into the rubbery first-stage core. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of stages containing lower alkyl methacrylate. The free radical initiator will be used in an effective amount, which will vary depending on the monomers, the temperature and the method of addition, but, generally, the quantity of initiator will vary from about 0.001 to 2% by weight in each polymerization stage based on the weight of the monomer charge but should not exceed about 5% by weight based on the total weight of the monomer charged in both stages.

In somewhat greater detail, in the first-stage, a rubbery, uniformly crosslinked copolymer is formed by emulsion copolymerizing an alkyl ester of acrylic acid with small amounts of a crosslinker having at least two addition polymerizable vinylidene groups of substantially equal reactivity and a graftlinking monomer comprising an allyl ester of an alpha, beta-ethylenically unsaturated mono or dicarboxylic acid having terminal ethylenic unsaturation or an allyl ester of an alpha, beta-ethylenically unsaturated-alpha, beta-dicarboxylic acid in the presence of 0.1 to 3.0 percent by weight emulsifier based on the weight of the first-stage monomers and an initiating system. The first-stage monomers may be added to the polymerization zone gradually or in a single charge.

In the second-stage, the monomers having a $T_g$ of at least 60° C. are added gradually and polymerized rapidly, thereby causing an attachment with the allyl groups of the allyl esters of the first-stage. As indicated above, gradual monomer addition facilitates layering and reduces deep penetration of the rubbery core by the hard monomer. Rapid polymerization is facilitated by polymerizing under what might be considered a monomer starved condition resulting from the gradual addition of this monomer stream at a temperature of at least 60° C. The monomer stream can be added continuously or in increments so long as the monomers are polymerized rapidly without deep penetration into the rubbery core. Additional initiator may be added. If desired up to 0.25% by weight emulsifier based on the weight of the second-stage monomer charge can be added in this stage. However, care must be exercised so that essentially no new additional emulsifier micels and polymer particles are formed during the second-stage. The resultant solid, thermoplastic polymeric product may be isolated from the emulsion by evaporation, by suitable coagulation and washing, such as by salt coagulation, by freezing, etc., or it may be isolated as by spray drying.

The heterogeneous emulsion-prepared polymers of the present invention may have melt index values in the range of 0.1 to 20, with the range 0.75 to 3.5 being preferred. Such polymer emulsions also desirably have minimum film forming temperatures (MFT) of approximately 60° C. to 100° C. After drying, the isolated polymer particles are then converted into film and sheets by melt techniques (heat and pressure).

Films and sheets formed from the compositions of the present invention may vary in thickness from about .1 mil to 50 mils, with the range 1 to 10 mils being preferred. For the purpose of this invention the term "film" is generic to the term "sheet." Ordinarily, such films are prepared by extrusion and blowing techniques well known in the art, for example, at temperatures ranging from about 350° F. to 500° F. The films may also be formed by compression molding. Where desired, the films may be compounded to include common fillers, pigments, dyes, stabilizers, etc. Common fillers which may be employed include, for example, ground and precipitated calcium carbonate, barytes, diatomaceous earth, various clays, etc. Common pigments which may be used include, for example, titanium dioxide, cadmium reds, chrome oranges and yellows, phthalocyanine greens and blues, etc. If fillers or pigments are employed, the first-stage particles can have a size up to about 3,000 A. since stress-whitening and haze do not deleteriously effect filled or pigmented heteropolymer systems.

As used in the specification and claims attached hereto, the term "polyfunctional crosslinking monomer" includes difunctional or bifunctional crosslinking monomers, that is, monomers containing two reactive or functional groups as well as crosslinking monomers containing more than two reactive or functional groups. The term "sequentially emulsion polymerized" or "sequentially emulsion produced" refers to polymers (which term includes copolymer as well as homopolymers) which are prepared in aqueous dispersion or emulsion and in which successive monomer charges are polymerized onto or in the presence of a performed latex prepared from a prior monomer charge and stage. In this type of polymerization, the succeeding stage is attached to and intimately associated with the preceding stage. Thus, the sequentially prepared polymers of the present invention are made by a process in which the total particle content is substantially constant upon completion of the first-stage polymerization, i.e., new additional and distinct particles are avoided after formation of the first-stage particles.

In the examples which follow, the tensile test data were obtained in accordance with ASTM Test D882; fold endurance was determined in accordance with Schopper Fold Endurance Test using 120 double folds per minute, and the procedure in accordance with ASTM Test D643. The brittleness temperature by impact was conducted in accordance with ASTM D1790, with the values given being for 50% failure.

The melt index is the weight of the polymer in grams extruded in ten minutes through a cylindrical orifice of 0.08 inch diameter and 0.3 inch length. The polymer is extruded at a temperature of 200° C. under a pressure of 200 p.s.i. When the melt index is too low, the material is quite difficult to process on ordinary manufacturing equipment.

The stress whitening values were determined by elongation of film specimen 15% at a strain rate of 2000% per minute. The stress whitening was then measured in terms of film clarity with the range extending from clear to a very slight haze to translucent to opaque.

The attachment values given are determined by measuring the acetone soluble and insoluble fractions of the total composition. The value is calculated as the percent of the second-stage composition which is acetone insoluble.

EXAMPLE I

A latex heteropolymer of this invention composed of about 42% by weight of a first-stage polymer composed of 100 parts by weight butyl acrylate, 1 part by weight butylene glycol diacrylate and 0.75 parts by weight allyl methacrylate and about 58% by weight of a second-stage polymer layer composed of 95 parts methyl methacrylate and 5 parts butyl acrylate was produced in the following manner:

A first-stage emulsified monomer charge was prepared by mixing 623.5 pounds butyl acrylate, 6.24 pounds 1,3-butylene glycol diacrylate, 4.68 pounds allyl methacrylate, 90 pounds of dioctyl sodium sulfosuccinate (50% active) and 270 pounds water until a smooth emulsion was formed. The first-stage emulsified monomer charge and .72 pounds diisopropyl benzene hydroperoxide were added gradually in separate streams over a 1½ hour period to a nitrogen sparged reactor containing 2,415 pounds deionized water, .53 pounds acetic acid, 1.2 pounds of dioctyl sodium sulfosuccinate (50% active) and .36 pounds sodium formaldehyde sulfoxalate initially maintained at 50° C. The exothermic reaction raised the reactor temperature to 72° C. After all the emulsified monomer and catalyst had been added, .11 pounds sodium persulfate dissolved in 10 pounds water was added to the reactor and heated to 84 to 86° C. to bring the first-stage polymerization to completion. The second-stage monomer charge was prepared by mixing 831.2 pounds methyl methacrylate, 44.8 pounds butyl acrylate, 1.8 pounds tertiary dodecyl mercaptan, and 8.7 pounds dioctyl sodium sulfosuccinate (50% active). After 1.8 pounds sodium formaldehyde sulfoxalate dissolved in 65 pounds water was added to the first-stage latex, maintained at 84–86° C., the second-stage monomer charge and 7.2 pounds diisopropyl benzene hydroperoxide were added gradually in separate stream over a three hour period. The reaction was maintained at 84–86° C. for thirty minutes after all the second-stage monomer and peroxide was added to complete the polymerization. The polymer particles were isolated by spray drying, melt extruded into ⅛" to ¼" strands at 380° C. to 450° F., cooled and cut into ¼" lengths. The pellets were thoroughly dried and melt extruded into a film at 400–480° F.

The melt processed film showed a haze value of about 4% as prepared, about 6% after seven days water immersion at about 43° C., and about 5% after subsequent drying for sixteen hours at room temperature. At a strain rate of 50% per minute, the film had break strain of 110%, a break stress of 3,900 p.s.i., and elastic modulus of 140,000 p.s.i., and a work-to-rupture of 3,600 in. lbs./in.$^3$. At a strain rate of 500% per minute, the above values for the film were 100%, 4,200 p.s.i., 190,000 p.s.i., and 3,800 in. lbs./in.$^3$, respectively. The film showed an average fold endurance of 6,000 cycles to fail and a brittleness temperature of −33° C. The film product is only slightly stress whitened under ordinary conditions.

When an essentially identical composition was prepared except that the allyl methacrylate was omitted, the haze values were at least doubled, the break strain values were more than halved, and there was a general reduction in the other tensile characteristics. The fold endurance decreased by a factor of 10 (600 cycles to failure) and the brittleness temperature rose to −11° C. The film exhibits substantial stress whitening under ordinary conditions. In both instances, the particle size of the elastomer particles was less than 1300 A.; in the first example, the particle size was 1190 A., and for the Comparative example, the particle size was 1280 A.

EXAMPLE II

Films were produced from polymer latex particles of the graflinked composition utilized in Example I but with different first-stage particle sizes ranging from 1300 A. down to 1130 A. The only property of the film which exhibited substantial change was stress whitening. Film produced from latices in which the first-stage particle size was less than 1300 A., e.g., 1270 A., was significantly less subject to stress whitening than film produced from latices having a first-stage particle size of 1300 A. At higher graftlinker levels, the tendency to stress whiten was reduced even with films produced from latices of larger first-stage particle size.

EXAMPLE III

The nature of the emulsifier used in the preparation of films of the present invention can affect the haze level of the film. This was illustrated by the preparation of film from a polymer composition comprising 42% of an elastomeric first-stage polymer (100 parts butyl acrylate/1 part butylene glycol diacrylate/0.5 part allyl methacrylate) and 58% of a second-stage thermoplastic polymer (5 parts butyl acrylate/95 parts methyl methacrylate/0.2 part dodecyl mercaptan). The polymer was produced using 0.42% emulsifier and the polymer particles were recovered by spray drying. The haze level was measured for film samples made from each of the latices prior to immersion tests, immediately following immersion tests, and immediately following drying. The immersion test consisted of immersing the samples in water at 43° C. for one week. The immersion test was then followed by the drying cycle in which the samples were dried for sixteen hours at room temperature and ambient humidity. Where sodium octylphenoxydiethoxyethyl sulfonate was utilized as the emulsifier, the film exhibited 8% haze initially, 23% after immersion, and 14% after drying. Film produced from a latex utilizing dioctyl sodium sulfosuccinate as the emulsifier exhibited a constant 4% haze level at all three measurements.

The presence of salt apparently also can affect the haze level. For example, using sodium octylphenoxyethoxyethyl sulfonate as the emulsifier, film produced from the latex exhibited haze levels of 6%, 6% and 5%, respectively, for the three tests. The inclusion of sodium chloride with the same emulsifier however, gave haze levels of 6%, 9% and 13%, respectively, for the same tests. It was found, however, that when the latex particles were recovered by coagulation rather than by spray drying film produced from coagulated particles exhibited very low haze levels, particularly, when compared to films produced from the spray-dried latex despite the fact that the same emulsifier was used in each case.

EXAMPLE IV

The effect of graftlinker level and chain transfer agent is illustrated by the data in the table which follows. In the table, ALMA refers to allyl methacrylate, ALA refers to allyl acrylate, and DALM refers to diallyl maleate. For each of the tests, the first-stage elastomeric composition constituted 42% of the overall latex and consisted of 100 parts of butyl acrylate, 1 part of butylene glycol diacrylate and the designated amount of graftlinker. The second-stage thermoplastic material formed 58% of the overall composition and consisted in each case of 5 parts butyl acrylate, 95 parts methyl methacrylate and the designated amount of chain transfer agent, t-dodecyl mercaptan ("t-ddm").

EXAMPLE V

The interrelationship of graftlinker and crosslinker were of the same composition as Example I except that the butylene glycol diacrylate and allyl methacrylate were varied as is indicated in Table 2.

While the invention has been exemplified with the preferred monomer system and with the preferred proportions, it is not limited thereto. It is broadly applicable to all of the systems described and claimed in the aforementioned patent applications Ser. No. 526,038, Ser. No. 735,191 and Ser. No. 877,847. The use of both graftlinker and crosslinker permits the production of an exceptional film material from latices produced without the intermediate stages essential to the latices of said patent applications. The use of graftlinker permits the initial, elastomeric polymer material to be joined directly to the final-stage, thermoplastic polymer material without the compatibility and attachment problems associated with omission of the intermediate stages in the absence of graftlinker. To obtain the desirable film properties from such system, however, it is essential to observe the limitations on particle size, attachment level, gradual monomer addition of the second-stage, etc. described herein.

TABLE 1

| Graftlinker (percent) | t-ddm (part-by-weight) | Attachment (percent) | Melt flow rate | Haze level (percent) | Stress whitening | Brittle point (° C.) | Tensile data 50%/min. Break strain (percent) | Tensile data 50%/min. Break stress (p.s.i.) | Tensile data 500%/min. Break strain (percent) | Tensile data 500%/min. break stress (p.s.i.) |
|---|---|---|---|---|---|---|---|---|---|---|
| ALMA: | | | | | | | | | | |
| 0 | 0.5 | <5 | ~400 | 14 | Opaque | −15 | 45 | 3,200 | 9 | 3,700 |
| 0.2 | .5 | 13 | 295 | 7 | do | 0 | 88 | 3,500 | 26 | 4,000 |
| 0.5 | .5 | 21 | 160 | 3 | do | −15 | 97 | 3,400 | 48 | 3,500 |
| 0.75 | .5 | 26 | 120 | 2 | Very slight haze | −33 | 93 | 3,600 | 51 | 3,900 |
| 1.0 | .5 | 32 | 178 | 3 | Translucent | −35 | 103 | 3,500 | 50 | 3,900 |
| ALA: 0.67 | .5 | 22 | 80 | 2 | do | −30 | 73 | 3,200 | | |
| DALM: 0.59 | .5 | 27 | 70 | 4 | Opaque | −35 | 86 | 3,500 | | |
| ALMA: | | | | | | | | | | |
| 0 | 0.2 | <5 | 140 | 5 | do | −20 | 84 | 3,400 | 54 | 3,700 |
| 0.2 | .2 | | 45 | 4 | do | −28 | 123 | 3,800 | 103 | 4,200 |
| 0.5 | .2 | 25 | 50 | 5 | Very slight haze | −34 | 107 | 3,600 | 87 | 3,900 |
| 0.75 | .2 | | 20 | 4 | do | −48 | 113 | 3,800 | 97 | 4,200 |
| 1.0 | .2 | 41 | 30 | 4 | Clear | −45 | 132 | 4,400 | 113 | 4,200 |
| DALM: | | | | | | | | | | |
| 0.1 | .2 | 28 | 20 | 29 | Opaque | −24 | 21 | 3,100 | 9 | 3,900 |
| 0.2 | .2 | 40 | 20 | 16 | Very slight haze | <−43 | 93 | 3,400 | 64 | 3,800 |
| 0.3 | .2 | 45 | 10 | 17 | Clear | <−43 | 81 | 3,500 | 57 | 4,000 |
| 0.6 | .2 | 61 | (¹) | 13 | Very slight haze | <−43 | 64 | 3,500 | 18 | 4,100 |
| 1.3 | .2 | 85 | (¹) | | | | 10 | 3,700 | 19 | 4,100 |

¹ No flow.

TABLE 2

| Crosslinker (BDA) level, percent | Graftlinker (ALMA) level, percent 0 | 0.2 | 0.5 | 0.75 | 1.0 | Property |
|---|---|---|---|---|---|---|
| 0 | Not a heteropolymer | | | 24% 120 4 −30° C. | | Attachment MFR Brittle point Haze Elong. at strain rate of— |
| | | | | 99% 74% | | 50%/min. 500%/min. |
| | | | | Translucent | | Stress whitening |
| 0.2 | 4% 580 42 −29° C. | 13% 70 7 −30° C. | | 26% 90 2 −30° C. | 29% 70 3 −30° C. | Attachment MFR Brittle point Haze Elong. at strain rate of— |
| | 32% 31% | 77% 51% | | 107% 77% | 120% 77% | 50%/min. 500%/min. |
| | Opaque | Opaque | | Translucent | Translucent | Stress whitening |
| 0.5 | | | | 27% 90 3 −25° C. | 70 4 −29° C. | Attachment MFR Brittle point Haze Elong. at strain rate of— |
| | | | | 126% 86% | 112% 69% | 50%/min. 500%/min. |
| | | | | Translucent | Translucent | Stress whitening |
| 1.0 | 0% 290 14 −15° C. | 295 7 0° C. | 160 3 015° C. | 35% 120 2 −33° C. | 178 3 −35° C. | Attachment MFR Brittle point Haze Elong. at strain rate of— |
| | 45% 9% | 88% 26% | 97% 48% | 93% 100% | 103% 50% | 50%/min. 500%/min. |
| | Opaque | Opaque | Opaque | Clear | Translucent | Stress whitening |

While this invention is primarily directed to films produced by heat and pressure, the polymerization process utilizing the monomer charges describes herein can be used to produce polymer particles which can be applied from solvent to form excellent protective coatings. For example, these coatings can be used as overprint varnishes for decals in order to impart uniform gloss to decals and to protect the printing on decals from deterioration due to the elements and/or accidental spillage of aliphatic hydrocarbons. For this use, the particles preferably comprise from about 25% up to about 40% by weight of the first-stage, rubbery crosslinked polymer having a $T_g$ below about 10° C. and the balance a second-stage, thermoplastic polymer having a $T_g$ of at least 60° C. In addition the first-stage polymer particles can have a particle size up to about 3000 A.

In somewhat greater detail, the heteropolymers suitable for solvent coatings are produced by (1) Emulsion polymerizing, to a particle size up to about 3000 A., a monomer mixture having a $T_g$ below about 10° C. consisting essentially of:

(a) a principal monomer system selected from the group consisting of:
    (i) at least one $C_1$ to $C_8$ alkyl acrylate, and
    (ii) mixtures comprising a major amount of one or more of said alkyl acrylates with a minor amount of one or more copolymerizable monoethylenically unsaturated monomers;

(b) a polyfunctional crosslinking monomer for said principal monomer system; and (c) at least one allyl ester of an $\alpha,\beta$-unsaturated carboxylic acid to form said first-stage polymer, the relative proportions of (b) and (c) being sufficient to substantially uniformly crosslink said principal monomer system and to provide a level of attachment of said first-stage polymer to said second-stage polymer of at least 20%; and (2) Attaching said second-stage polymer to said first-stage polymer particles by adding gradually and polymerizing rapidly under emulsion polymerization conditions a monomer stream consisting essentially of at least 80% by weight of a hard alkyl ester of methacrylic acid, and the balance of one or more copolymerizable monoethylenically unsaturated monomers to an average molecular weight of from 80,000 to 300,000, (3) Isolating the polymer particles of step (2) and (4) Dissolving the polymer particles in a suitable solvent, such as methyl ethyl ketone, diacetone alcohol, etc.

What is claimed is:

1. A process comprising
(A) forming heteropolymer latex particles wherein the particles individually consist essentially of from about 25% up to about 50% by weight of a first-stage, rubber, crosslinked polymer having a $T_g$ below about 10° C. and the balance a second-stage, thermoplastic polymer having a $T_g$ of at least 60° C. polymerized directly thereon and attached thereto, said heteropolymer particles formed by the steps of: (1) emulsion polymerizing, to an average particle size up to about 1300 A., a monomer mixture consisting essentially of:
    (a) a principal monomer system selected from consisting of:
        (i) at least one $C_1$ to $C_8$ alkyl acrylate, and
        (ii) mixtures comprising a major amount of one or more of said alkyl acrylates with a minor amount of one or more copolymerizable monoethylenically unsaturated monomers;
    (b) a polyfunctional crosslinking monomer for said principal monomer system; and
    (c) at least one allyl ester of an $\alpha,\beta$-unsaturated carboxylic acid
to form said first-stage polymer, the relative proportions of (b) and (c) being sufficient to substantially uniformly crosslink said principal monomer system and to provide a level of attachment of said first-stage polymer to said second-stage polymer of about 20% to 50%; and (2) attaching said second-stage polymer to said first-stage polymer particles by adding gradually and polymerizing rapidly under emulsion polymerization conditions a monomer stream consisting essentially of at least 80% by weight a hard alkyl ester of methacrylic acid, and the balance of one or more copolymerizable monoethylenically unsaturated monomers to an average molecular weight of from 80,000 to 300,000
(B) isolating the polymer particles of step (2)
(C) drying said isolated particles,
(D) and converting said dried particles into film by applying heat and pressure thereto.

2. The process in accordance with claim 1 in which said first-stage, rubbery, crosslinked polymer constitutes about 40 to 45% by weight of the overall heteropolymer composition.

3. The process in accordance with claim 1 in which the polyfunctional, croslinking monomer is present in an amount of 0.1 to 5% by weight of the principal monomer system and is an alkylene glycol diacrylate.

4. The process in accordance with claim 3 in which the allyl ester is present in an amount in excess of 0.5% by weight of the principal monomer system.

5. The process in accordance with claim 1, wherein said first-stage polymer particles are less than 1300 A.

6. The process comprising
(A) forming heteropolymer latex particles wherein the particles individually consist essentially of from about 35% up to about 50% by weight of a first-stage, rubbery, crosslinked polymer having a $T_g$ below about 10° C. and the balance a second-stage, thermoplastic polymer having a $T_g$ of at least 60° C. polymerized directly thereon and attached thereto, said heteropolymer particles formed by the steps of: (1) emulsion polymerizing, a particle size up to about 1300 A., a monomer mixture consisting essentially of:
    (a) a principal monomer system selected from the group consisting of:
        (i) at least one $C_1$ to $C_8$ alkyl acrylate, and
        (ii) mixtures comprising a major amount of one or more of said alkyl acrylates with a minor amount of one or more copolymerizable monoethylenically unsaturated monomers;
    (b) from about 0.5 to 1.5% by weight of said principal monomer system of an alkylene glycol diacrylate; and
    (c) in excess of 0.5% by weight of said principal monomer system of at least one allyl ester of an $\alpha,\beta$-unsaturated carboxylic acid
to form said first-stage polymer, the relative proportions of (b) and (c) being sufficient to substantially uniformly crosslink said principal monomer system and to provide a level of attachment of said first-stage polymer to said second-stage polymer of at least 20% to about 50%, and (2) attaching said second-stage polymer to said first-stage polymer particles by adding gradually and polymerizing rapidly under emulsion polymerization conditions a monomer stream consisting essentially of at least 80% by weight of $C_1$ to $C_4$ alkyl methacrylate, and the balance of one or more copolymerizable monoethylenically unsaturated monomers to an average molecular weight of from 80,000 to 300,000,
(B) isolating the polymer particles of step (2),
(C) drying said isolated particles,
(D) and converting said dried particles into film by applying heat and pressure thereto.

7. The process in accordance with claim 6 in which said principal monomer system consists essentially of at least one monomer selected from the group consisting of ethyl acrylate and butyl acrylate.

8. The process in accordance with claim 6 in which said second-stage, thermoplastic polymer consists essentially of butyl acrylate and methyl methacrylate.

9. The process in accordance with claim 6 in which said allyl ester is allyl methacrylate.

10. The process in accordance with claim 6 in which said principal monomer system consists essentially of at least one monomer selected from the group consisting of ethyl acrylate and butyl acrylate; said second-stage, thermoplastic polymer consists essentially of methyl methacrylate and a minor amount of butyl acrylate; said alkylene glycol diacrylate is butylene glycol diacrylate; and said allyl ester is allyl methacrylate.

11. The process in accordance with claim 10 in which said second-stage polymer is formed by emulsion polymerization in the presence of about 0.5% by weight of t-dodecyl mercaptan, and the final latex particles are recovered from emulsion by spray drying.

12. The process in accordance with claim 10 in which said second-stage polymer is formed by emulsion polymerization in the presence of about 0.5% by weight of t-dodecyl mercaptan, and the final latex particles are recovered from emulsion by coagulation.

13. The process of
(A) forming heteropolymer latex particles wherein the particles individually consist essentially of from about 40% up to about 45% by weight of a first-stage, rubbery, crosslinked polymer having a $T_g$ below about 10° C., and the balance a second-stage, thermoplastic polymer having a $T_g$ of at least 60° C. polymerized directly thereon and attached thereto, said heteropolymer particles formed by the steps of: (1) emulsion polymerizing, to a particles size of from about 1000 A. to about 1200 A., a first monomer mixture consisting essentially of:
   (a) at least one monomer selected from the group consisting of ethyl acrylate and butyl acrylate;
   (b) from about 0.5 to 1.5% by weight of butylene glycol diacrylate; and
   (c) from about 0.7 to 1.0% by weight of allyl methacrylate
to form said first-stage polymer, the relative proportions of (b) and (c) being sufficient to substantially uniformly crosslink said principal monomer system and to provide a level of attachment of said first-stage polymer to said second-stage polymer of to about 20% to 50%; and (2) attaching said second-stage polymer to said first-stage polymer particles by adding gradually and polymerizing rapidly under emulsion polymerization conditions to an average molecular weight in the range of 100,000 to 150,000 a monomer stream consisting essentially of at least 80% by weight of methyl methacrylate, and the balance butyl acrylate (B) isolating the polymer particles of step (2),
(C) drying said isolated particles,
(D) and converting said dried particles into film by applying heat and pressure thereto.

14. The process in accordance with claim 13 in which said first monomer mixture consists essentially of 100 parts by weight butyl acrylate, about 1 part by weight butylene glycol diacrylate and about 0.75 part by weight allyl methacrylate, and wherein said second-stage, thermoplastic polymer consists essentially of 95% methyl methacrylate and about 5% of butyl acrylate.

15. The process in accordance with claim 13 in which said second-stage polymer is formed by emulsion polymerization in the presence of about 0.5% by weight of t-dodecyl mercaptan, and the final latex particles are recovered from emulsion by spray drying.

16. The proces in accordance with claim 13 in which said second-stage polymer is formed by emulsion polymerization in the presence of about 0.5% by weight of t-dodecyl mercaptan, and the final latex particles are recovered from emulsion by coagulation.

References Cited
UNITED STATES PATENTS

| | | | |
|---|---|---|---|
| 3,426,101 | 4/1969 | Ryan et al. | 260—876 R |
| 3,448,173 | 6/1969 | Ryan et al. | 260—876 R |
| 3,450,796 | 6/1969 | Griffin | 260—885 |
| 3,562,235 | 2/1971 | Ryan | 260—885 |
| 3,655,825 | 4/1972 | Souder et al. | 260—876 R |
| 3,660,537 | 5/1972 | Fryd | 260—885 |
| 3,678,133 | 7/1972 | Ryan | 260—876 R |

MURRAY TILLMAN, Primary Examiner

J. ZIEGLER, Assistant Examiner

U.S. Cl. X.R.

117—161 UZ; 161—247; 260—29.6 R, CM, 881, 883

UNITED STATES PATENT OFFICE
CERTIFICATE OF CORRECTION

Patent No. 3,812,205  Dated May 21, 1974

Inventor(s) David L. Dunkelberger

It is certified that error appears in the above-identified patent and that said Letters Patent are hereby corrected as shown below:

IN THE SPECIFICATION:

Column 5, line 32, "albylbenzenesulfonates" should read --alkylbenzenesulfonates-- lines 33-34, "albylphenoxypolyethylene" should read --alkylphenoxypolyethylene--

Col. 10, heading of "LABLE 2" should read --TABLE 2--

Signed and sealed this 7th day of January '975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,812,205    Dated May 21, 1974

Inventor(s) David L. Dunkelberger

It is certified that error appears in the above-identified patent and that said Letters Patent are hereby corrected as shown below:

IN THE SPECIFICATION:

Column 5, line 9, "intestices" should read --interstices--

" 51, "disopropylbenzene" should read --diisopropylbenzene--

Signed and sealed this 4th day of March 1975.

(SEAL)
Attest:

RUTH C. MASON
Attesting Officer

C. MARSHALL DANN
Commissioner of Patents
and Trademarks